(12) United States Patent
Dravida

(10) Patent No.: US 7,603,141 B2
(45) Date of Patent: Oct. 13, 2009

(54) MULTI-ANTENNA STATION WITH DISTRIBUTED ANTENNAS

(75) Inventor: Subrahmanyam Dravida, Shrewsbury, MA (US)

(73) Assignee: Qualcomm, Inc., San Diego, CA (US)

( * ) Notice: Subject to any disclaimer, the term of this patent is extended or adjusted under 35 U.S.C. 154(b) by 652 days.

(21) Appl. No.: 11/144,994

(22) Filed: Jun. 2, 2005

(65) Prior Publication Data
US 2006/0276227 A1   Dec. 7, 2006

(51) Int. Cl.
*H04M 1/00* (2006.01)
(52) U.S. Cl. ........... 455/562.1; 455/575.7; 455/561; 342/423; 342/434
(58) Field of Classification Search ............ 455/562.1, 455/424, 425, 456.5, 456.6, 63.4, 65, 63.1, 455/83, 561, 575.7, 101, 129, 121, 193.1, 455/269, 272, 275, 522, 446, 73, 132; 342/423, 342/434, 74, 360, 361, 367.8; 343/853, 700 R, 343/751, 800, 814, 816; 370/480, 347, 329, 370/339, 325; 375/267, 257, 347, 299
See application file for complete search history.

(56) References Cited

U.S. PATENT DOCUMENTS

| | | | | |
|---|---|---|---|---|
| 4,963,889 A * | 10/1990 | Hatch | ............... | 342/357.08 |
| 6,212,242 B1 * | 4/2001 | Smith et al. | ............... | 375/299 |
| 6,801,514 B2 * | 10/2004 | Ma | ............... | 370/339 |
| 6,816,115 B1 * | 11/2004 | Redi et al. | ............... | 342/367 |
| 6,847,628 B1 * | 1/2005 | Sakuma | ............... | 370/347 |
| 7,127,218 B2 * | 10/2006 | Lindenmeier | ............... | 455/101 |
| 7,139,324 B1 * | 11/2006 | Ylitalo et al. | ............... | 375/267 |
| 7,174,170 B2 * | 2/2007 | Steer et al. | ............... | 455/446 |
| 7,460,077 B2 * | 12/2008 | Hemmi et al. | ............... | 343/725 |
| 2002/0172223 A1 * | 11/2002 | Stilp | ............... | 370/480 |
| 2003/0060218 A1 | 3/2003 | Billerbeck | | |
| 2003/0169722 A1 * | 9/2003 | Petrus et al. | ............... | 370/347 |
| 2003/0185309 A1 * | 10/2003 | Pautler et al. | ............... | 375/257 |
| 2003/0190897 A1 * | 10/2003 | Lei et al. | ............... | 455/101 |
| 2003/0227414 A1 * | 12/2003 | Saliga et al. | ............... | 343/725 |
| 2004/0018815 A1 * | 1/2004 | Lin et al. | ............... | 455/73 |
| 2004/0063430 A1 * | 4/2004 | Cave et al. | ............... | 455/436 |
| 2004/0082356 A1 * | 4/2004 | Walton et al. | ............... | 455/522 |
| 2004/0196805 A1 * | 10/2004 | Lee | ............... | 370/329 |
| 2004/0204105 A1 * | 10/2004 | Liang et al. | ............... | 455/562.1 |
| 2005/0096058 A1 * | 5/2005 | Warner et al. | ............... | 455/446 |
| 2005/0130606 A1 * | 6/2005 | Wang et al. | ............... | 455/101 |
| 2005/0186910 A1 * | 8/2005 | Moorti et al. | ............... | 455/65 |
| 2005/0245280 A1 * | 11/2005 | Liu et al. | ............... | 455/522 |
| 2005/0246334 A1 * | 11/2005 | Tao et al. | ............... | 707/5 |

(Continued)

FOREIGN PATENT DOCUMENTS

EP    1 617 598 A    1/2006

*Primary Examiner*—Duc Nguyen
*Assistant Examiner*—Charles Chow
(74) *Attorney, Agent, or Firm*—Turocy & Watson, LLP

(57) ABSTRACT

A multi-antenna station with distributed antennas and capable of providing good performance for terminals distributed throughout the coverage area of the multi-antenna station is described. The multi-antenna station includes multiple antennas, a controller, and at least one transmitter unit. The multiple antennas are coupled to the multi-antenna station and include at least one remote antenna that is located away from the multi-antenna station. The controller selects a set of one or more antennas from among the multiple antennas for data transmission to a terminal. The at least one transmitter unit transmits data to the terminal via the set of one or more antennas.

36 Claims, 6 Drawing Sheets

U.S. PATENT DOCUMENTS

2006/0120477 A1* 6/2006 Shen et al. .................. 375/267
2006/0135097 A1* 6/2006 Wang et al. ................. 455/132
2006/0223450 A1* 10/2006 Dacosta ...................... 455/73
2006/0234777 A1* 10/2006 Vannithamby et al. ... 455/562.1
2006/0246854 A1* 11/2006 Nakao ........................ 455/101
2008/0056414 A1* 3/2008 Kim et al. ................... 375/347

* cited by examiner

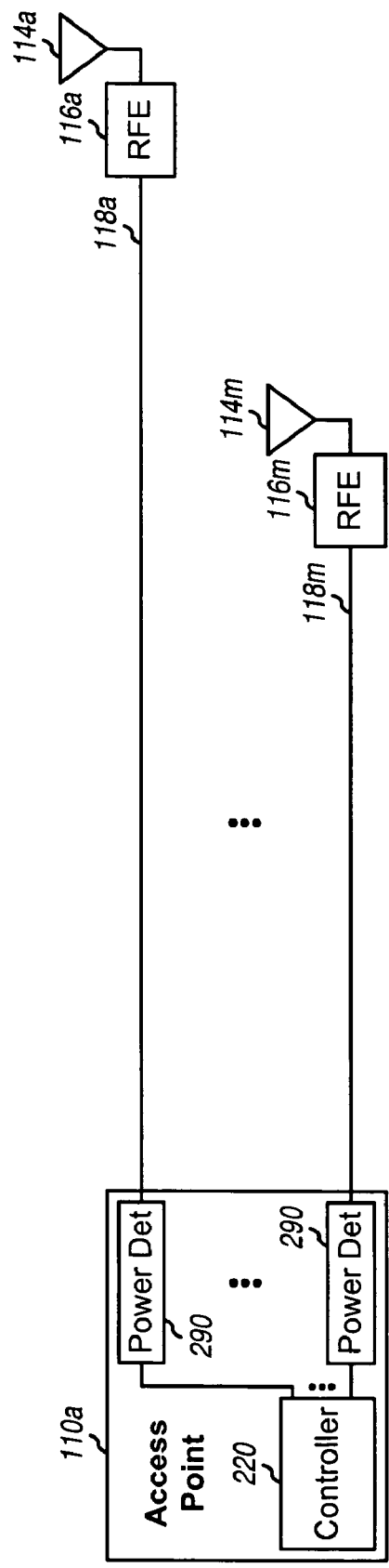
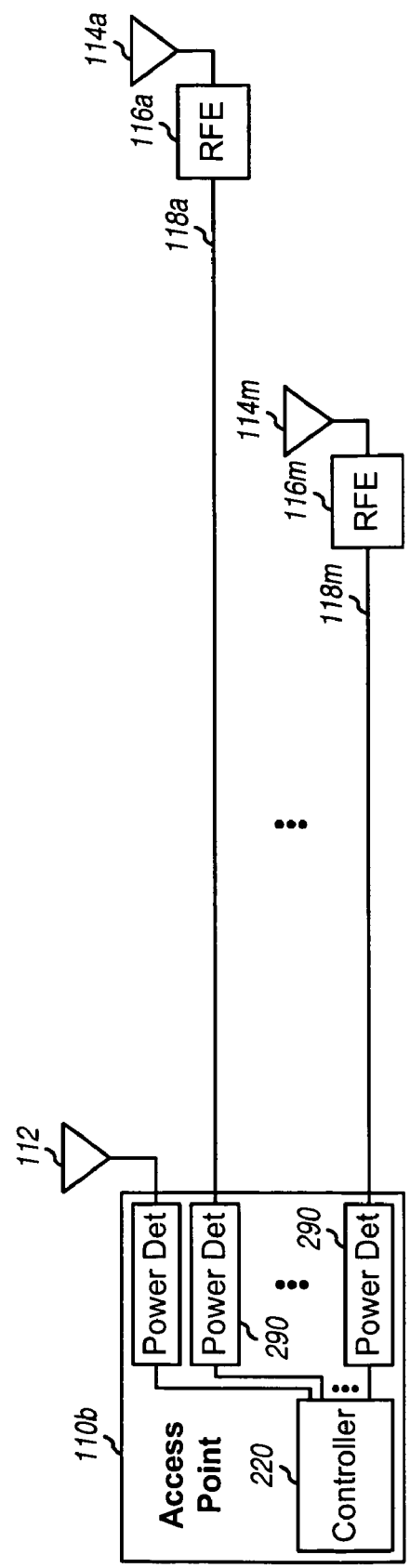
FIG. 2A
FIG. 2B

US 7,603,141 B2

MULTI-ANTENNA STATION WITH DISTRIBUTED ANTENNAS

BACKGROUND

I. Field

The present disclosure relates generally to communication, and more specifically to a multi-antenna station.

II. Background

A wireless local area network (WLAN) has one or more access points that serve one or more user terminals. The number of access points and the number of user terminals are dependent on the size the WLAN. For example, a single access point may serve multiple user terminals distributed throughout a WLAN deployment area, which may be an entire building, a floor of a building, and so on. If the access point is stationary, which is often the case, then the performance achieved by each user terminal is typically dependent on the location of that user terminal relative to the access point. It is well known that a radio frequency (RF) signal is degraded by obstructions (e.g., walls) and artifacts (e.g., noise and interference) in the signal paths between a transmitter and a receiver. Thus, a nearby user terminal that is located close to, and in sight of, the access point can achieve better performance than a remote user terminal that is located far away from, and not in visible range of, the access point. Consequently, different levels of performance (e.g., different data rates) are typically achievable for different user terminals located in different parts of the WLAN deployment area.

It is desirable to provide similar levels of performance to all or as many user terminals as possible in the WLAN deployment area. There is therefore a need in the art for an access point capable of providing such performance to the user terminals.

SUMMARY

A multi-antenna station with distributed antennas and capable of providing good performance for terminals distributed throughout the coverage area of the multi-antenna station is described herein. According to an embodiment of the invention, a multi-antenna station is described which includes multiple antennas, a controller, and at least one transmitter unit. The multiple antennas couple to the multi-antenna station and comprise at least one remote antenna that is located away from the multi-antenna station. The controller selects a set of one or more antennas from among the multiple antennas for data transmission to a terminal. The at least one transmitter unit transmits data via the set of one or more antennas to the terminal.

According to another embodiment, a method is provided in which a set of one or more antennas is selected from among multiple antennas for data transmission from a multi-antenna station to a terminal. The multiple antennas comprise at least one remote antenna that is located away from the multi-antenna station. Data is transmitted to the terminal via the set of one or more antennas.

According to yet another embodiment, an apparatus is described which includes means for selecting a set of one or more antennas from among multiple antennas for data transmission to a terminal, where the multiple antennas comprise at least one remote antenna that is located away from the apparatus, and means for transmitting data to the terminal via the set of one or more antennas.

Various aspects and embodiments of the invention are described in further detail below.

BRIEF DESCRIPTION OF THE DRAWINGS

FIGS. 2A through 2D show four antenna configurations for the access point.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
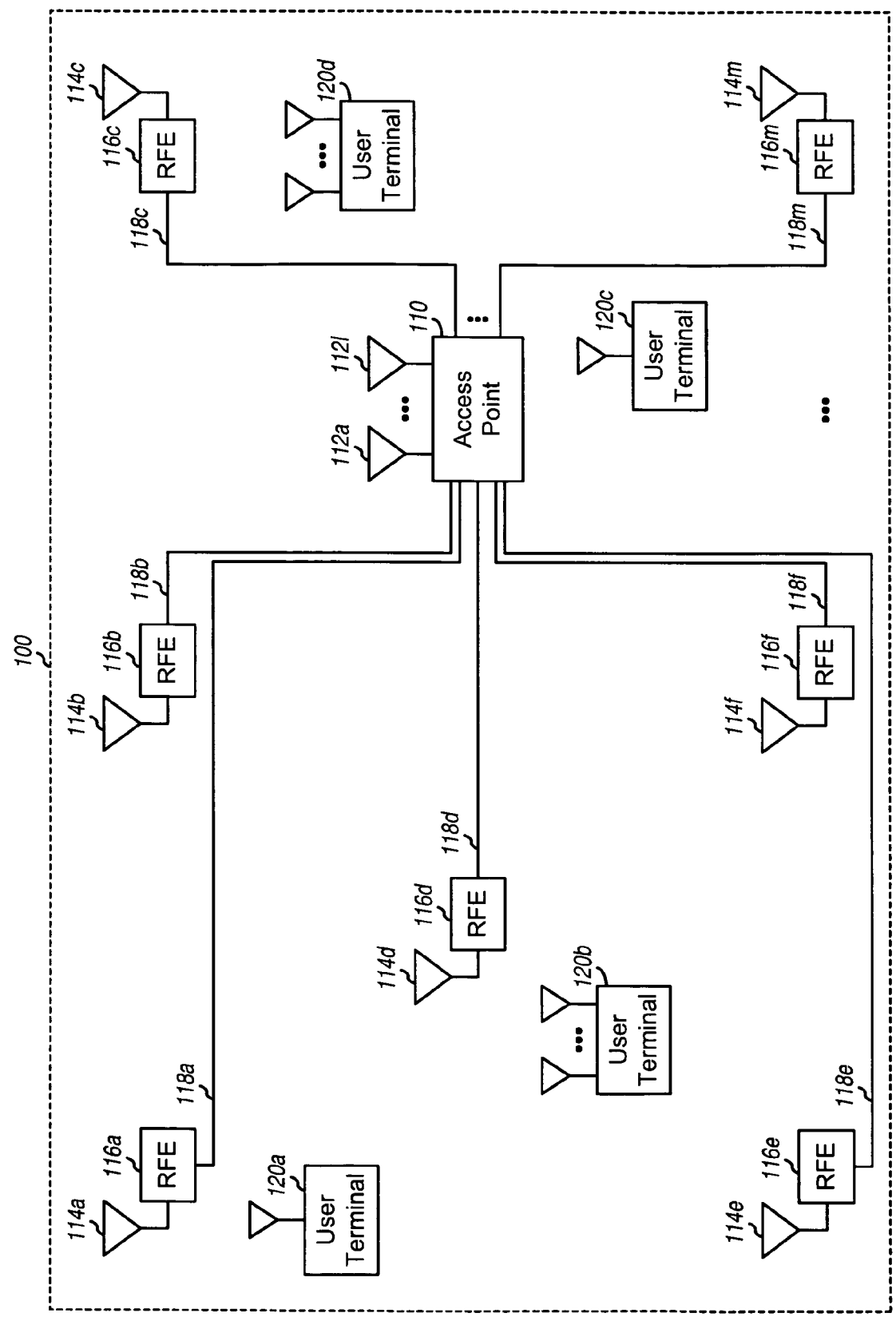
FIG. 1 shows a WLAN with a single access point and multiple user terminals.

FIG. 1 shows an exemplary WLAN 100 with a single access point (AP) 110 that serves multiple user terminals (UT) 120. Access point 110 is a multi-antenna station that is equipped with multiple antennas, which may be used for data transmission and reception. An access point may also be called a base station, a Node B, or some other terminology. Each user terminal 120 may be equipped with a single antenna or multiple antennas. A user terminal may also be called a mobile station, a user equipment, a wireless device, or some other terminology.

Access point 110 may send a multiple-input multiple-output (MIMO) transmission to a multi-antenna user terminal or a multiple-input single-output (MISO) transmission to a single-antenna user terminal. Access point 110 may also receive a MIMO transmission from a multi-antenna user terminal or a single-input multiple-output (SIMO) transmission from a single-antenna user terminal. A MIMO channel formed by multiple ($N_T$) transmit antennas at a transmitter and multiple ($N_R$) receive antennas at a receiver may be decomposed into $N_S$ spatial channels, where $N_S \leq \min \{N_T, N_R\}$. The $N_S$ spatial channels may be used to transmit data in parallel to achieve higher throughput and/or redundantly to achieve greater reliability. A MISO channel formed by the multiple transmit antennas and the single receive antenna is composed of a single spatial channel. The multiple transmit antennas may be used to transmit data in a manner to improve reliability. A SIMO channel formed by the single transmit antenna and the multiple receive antennas is also composed of a single spatial channel. The multiple receive antennas may be used to receive data in a manner to improve reliability.

Access point 110 may be a fixed station and may be placed at any location within the WLAN deployment area, which may be a building, a floor of a building, a home, an office complex, a store, and so on. User terminals 120 may be distributed throughout the WLAN deployment area. Some user terminals (e.g., user terminals 120c and 120d) may be located close to access point 110 while some other user terminals (e.g., user terminals 120a and 120b) may be located far away from access point 110. Each user terminal 120 may be fixed or mobile. There are typically obstructions (e.g., walls) within the WLAN deployment area that degrade the RF signals transmitted between access point 110 and user terminals 120. There may also be other artifacts (e.g., interference) that can also degrade the RF signals. These obstructions and artifacts are not shown in FIG. 1 for simplicity.

To provide good performance to all or many user terminals 120, the multiple antennas of access point 110 are distributed throughout the WLAN deployment area. Access point 110 has L local antennas 112a through 112l that are mounted on or close to the access point. In general, L may be zero, one, or more than one, i.e., $L \geq 0$. Access point 110 further has M remote antennas 114a through 114m that are placed at different locations throughout the WLAN deployment area. Remote antennas 114 may be placed at different distances from access point 110, different angular positions with respect to access point 110, and so on. In general, M is one or greater, i.e., $M \geq 1$. The total number of local and remote antennas available for use by access point 110 is $N_{ap}$, which is $N_{ap} = L+M \geq 2$.

Various types of antennas may be used for local antennas 112 and remote antennas 114, which are also called the access point (AP) antennas. For example, each AP antenna may be a cross-pole antenna, a dipole antenna, a patch antenna (or chip), and so on. An antenna may also be called an antenna element, a radiation element, and so on. Each AP antenna is designed for the operating frequency band used for WLAN 100. Each AP antenna may also have any radiation pattern. The antenna type and the radiation pattern for each AP antenna may be selected based on the intended coverage area for that AP antenna. For example, an antenna with an omni-directional radiation pattern may be used for remote antenna 114d located near the middle of the WLAN deployment area in FIG. 1, antennas with directional radiation patterns may be used for remote antennas 114a, 114c, 114e and 114n located at the corners of the WLAN deployment area.

For the embodiment shown in FIG. 1, each remote antenna 114 couples to a respective remote front-end (RFE) 116 that performs signal conditioning (e.g., amplification, filtering, and so on) for the RF signals transmitted and received via that remote antenna. Several embodiments of remote front-end 116 are described below. Remote front-end 116 for each remote antenna 114 couples to access point 110 via a cable 118. Cable 118 may be a co-axial cable that is commonly used for cable television or may be some other type of cable that supports the operating frequency band for WLAN 100. Cable 118 may also be replaced with other types of communication link (e.g., RF, infrared, and so on). Remote front-end 116 can reduce signal loss due to cable 118 and can thus improve performance. In general, remote front-end 116 may or may not be used for each remote antenna 114.

The local and remote antennas for access point 110 may be arranged and selected in various manners. Several exemplary configurations of the local and remote antennas are described below. Several exemplary embodiments for selecting antennas for data transmission are also described below.

FIG. 2A shows an access point 110a with no local antenna and multiple (M>1) remote antennas 114a through 114m. Access point 110a is one embodiment of access point 110 in FIG. 1 and has $N_{ap}=M$ antennas that are available for data transmission and reception. Each remote antenna 114 couples to access point 110a via an associated remote front-end 116 and cable 118. For the embodiment shown in FIG. 2A, each remote antenna 114 couples to a respective power detector (Power Det) 290 within access point 110a. Each power detector 290 measures the power of the RF signal received by the associated antenna and provides power measurements to a controller 220. Controller 220 uses the power measurements from all power detectors 290 to select antennas for data transmission and reception.

FIG. 2B shows an access point 110b with a single (L=1) local antenna 112 and multiple (M>1) remote antennas 114a through 114m. Access point 110b is another embodiment of access point 110 in FIG. 1 and has $N_{ap}=M+1$ antennas that are available for data transmission and reception. For the embodiment shown in FIG. 2B, each of the M+1 antennas couples to a respective power detector 290 within access point 110. Controller 220 receives the power measurements from all power detectors 290 and selects antennas for data transmission and reception.

Figure 2C:
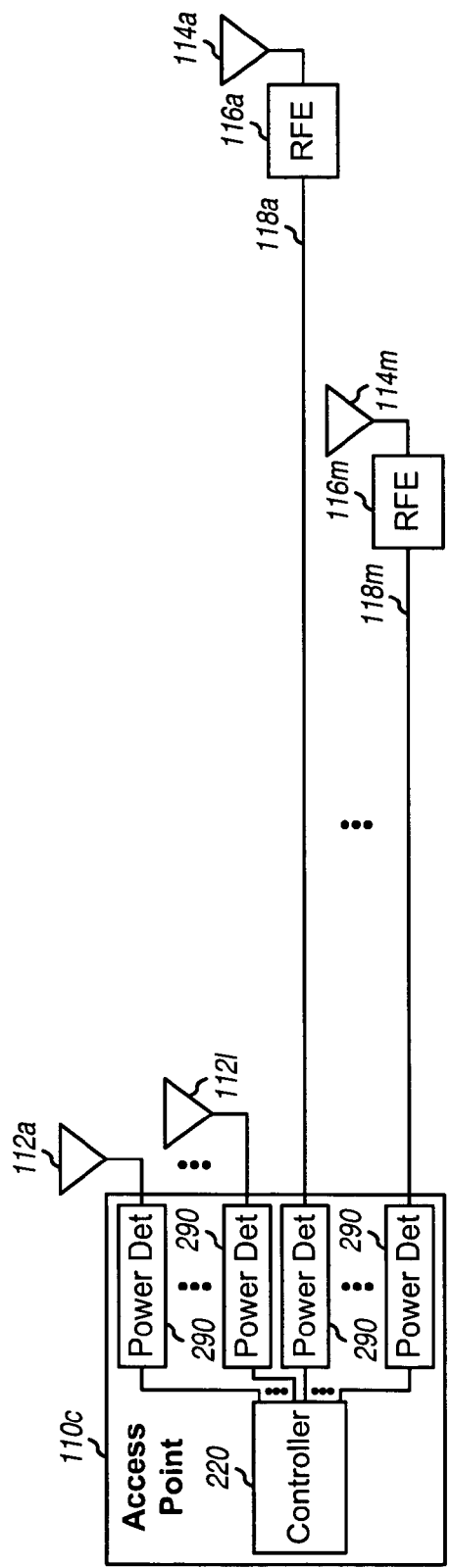

FIG. 2C shows an access point 110c with multiple (L>1) local antennas 112a through 112l and multiple (M>1) remote antennas 114a through 114m. Access point 110c is yet another embodiment of access point 110 in FIG. 1 and has $N_{ap}=L+M$ antennas that are available for data transmission and reception. In general, L may or may not be equal to M.

For the embodiments shown in FIGS. 2A through 2C, each of the $N_{ap}$ antennas available at the access point may be individually selected for data transmission and/or reception. Controller 220 may select one antenna, a subset of the available antennas, or all of the available antennas for data transmission to and/or data reception from a given user terminal. Controller 220 may select antennas based on the power measurements for the available antennas, as described below.

Figure 2D:
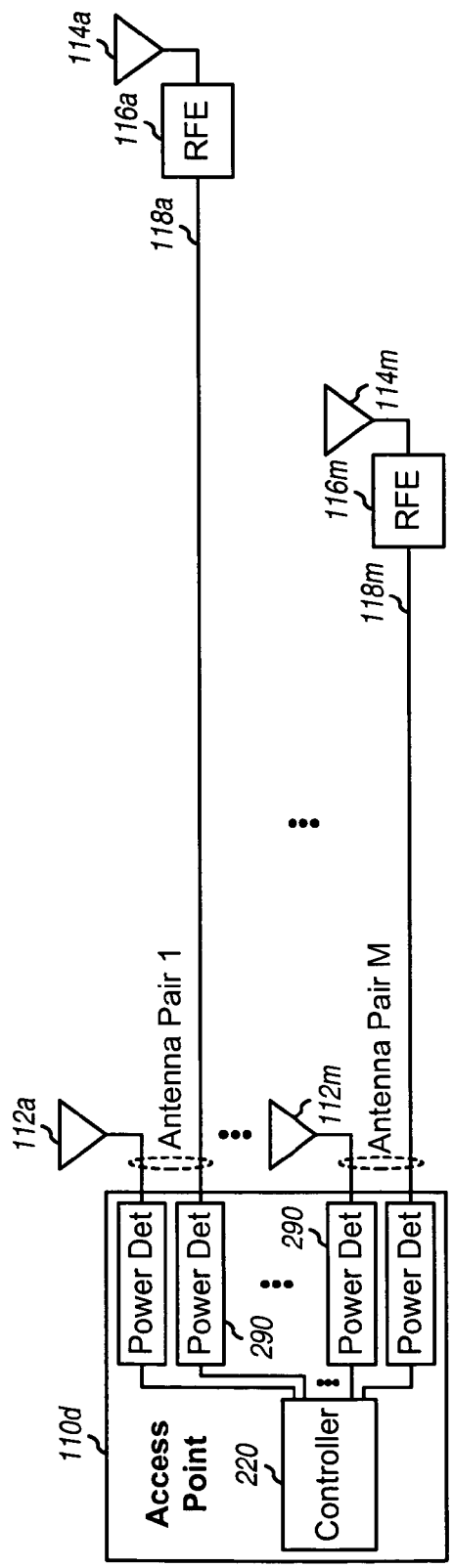

FIG. 2D shows an access point 110d with multiple (M>1) local antennas 112a through 112m and multiple (M) remote antennas 114a through 114m. Access point 110d is yet another embodiment of access point 110 in FIG. 1 and has $N_{ap}=2M$ antennas that are available for data transmission and reception. For the embodiment shown in FIG. 2D, each local antenna 112 is associated with one remote antenna 114. M pairs of antennas are formed with the M local antennas 112 and the M remote antennas 114. In an embodiment, controller 220 selects one or more antenna pairs for data transmission to a given user terminal and further selects one antenna in each selected pair, e.g., based on the power measurements for the two antennas in that pair.

WLAN 100 may impose a constraint that at most N antennas may be used for data transmission, where N may be equal to two, four, or some other value. WLAN 100 may also support multiple transmission modes. Each transmission mode may require a certain minimum number of antennas or a specific number of antennas for data transmission using that transmission mode, as described below. For simplicity, the following description assumes that access point 110 can select up to N antennas for data transmission to a given user terminal. Access point 110 also selects a transmission mode to use for data transmission based on the number of selected antennas. Access point 110 may select antennas for data transmission to the user terminal in various manners.

In an embodiment, access point 110 selects N antennas with the highest power measurements for data transmission to the user terminal, where $N<N_{ap}$. For the embodiments shown in FIGS. 2A through 2C, access point 110 receives power measurements for the $N_{ap}$ available antennas, sorts the power measurements (e.g., from highest to lowest), and selects the N antennas with the N highest power measurements. For the embodiment shown in FIG. 2D, access point 110 selects the N best pairs of antennas based on the power measurements and selects the better of the two antennas in each pair.

In another embodiment, access point 110 selects up to N antennas with power measurements exceeding a predetermined power threshold, $P_{th}$. Access point 110 may compare the power measurement for each antenna against the power threshold, retain the antenna if its power measurement exceeds the power threshold, and discard the antenna otherwise. Access point 110 selects the N best antennas if more than N antennas have power measurements that exceed the power threshold. Access point 110 may select fewer than N antennas if the power measurements for only these antennas exceed the power threshold. Access point 110 may select the best available antenna or a predetermined number of best antennas if no antennas have power measurements that exceed the power threshold.

In yet another embodiment, access point 110 initially selects the N best antennas with the highest power measurements and then discards all antennas having small contributions to the data transmission to the user terminal. This antenna pruning may be achieved as follows. Access point 110 orders the N best antennas based on their power measurement, e.g., from the highest power measurement $P_1$ to the lowest power measurement $P_N$ for the N antennas. Access point 110 then computes a power gap $\Delta P_i$ between each two adjacent sorted antennas i and i+1 as the difference in their power measurements, or $\Delta P_i = P_i - P_{i+1}$ for i=1, ..., N-1. Access point 110 next determines whether the power gap $\Delta P_i$ for any antenna pair exceeds a predetermined amount $\Delta P_{th}$, or whether $\Delta P_i > \Delta P_{th}$ for i=1, ..., N-1. If the power gap $\Delta P_j$ for a given antenna j exceeds the predetermined amount, then access point 110 discards all antennas with power measurements of $P_{j+1}$ or lower. This embodiment removes antennas having small contributions to the data transmission sent to the user terminal, which reduces crosstalk among the antennas.

The embodiments described above are for antenna selection based on power measurements available at access point 110. Access point 110 may select antennas based on other parameters instead of or in additional to received power. For example, access point 110 may select antennas based on (1) received signal-to-noise ratio (SNR), which is the ratio of the desired signal (e.g., pilot) over the total noise and interference, (2) received signal strength, which is the ratio of the desired signal over the total received power, or (3) some other indication of received signal quality. In the following description, an antenna measurement can refer to any type of measurement (e.g., power, SNR, signal strength, and so on) that is suitable for use to select antennas.

Access point 110 may also select antennas based on other information available for the antennas. In an embodiment, access point 110 selects antennas based on location information for the local and remote antennas. Each antenna may be associated with a set of one or more nearby antennas. This location information may be stored in a database. If a high power measurement is obtained for a given antenna, then access point 110 may select one or more other antennas that are known to be located nearby this antenna. For example, if a high power measurement is obtained for remote antenna 114a in FIG. 1, then access point 110 may select antenna 114b and/or antenna 114d for data transmission to the user terminal.

In another embodiment, access point 110 selects antennas based on location information for the local and remote antennas. If the locations of the local and remote antennas and the location of a user terminal are known, then access point 110 can select one or more antennas that are located nearby the user terminal. The locations of the AP antennas may be ascertained and provided during deployment. The location of the user terminal may be approximated via measurements and/or ascertained in some other manner.

In yet another embodiment, access point 110 selects antennas based on correlation information for the local and remote antennas. Some antennas may have high correlation, which results in excessive crosstalk and poor spatial separation between these antennas. Consequently, antennas with high correlation should not be selected together. The correlation information for the available antennas may be ascertained based on the placement, type and/or measurements for the antennas. For example, local antennas 112 may have high correlation because of their close spacing, and it may be preferable to select only one or a few local antennas for data transmission.

Access point 110 may also select antennas based on information obtained from higher layers that sit above a physical layer in a protocol stack. Access point 110 typically transmits data in packets to a user terminal. This user terminal may send back an acknowledgment (ACK) for each packet that is decoded correctly and a negative acknowledgment (NAK) for each packet that is decoded in error. Access point 110 may initially select a set of antennas for data transmission to the user terminal, e.g., based on the power measurements. If a large percentage of packets is decoded in error, then access point 110 may select a different set of antennas for data transmission to the user terminal.

Access point 110 may select antennas for data transmission to the user terminal in other manners, and this is within the scope of the invention. Access point 110 may select antennas based on any criterion or any combination of criteria.

Access point 110 may select different sets of antennas for data transmission to different user terminals, e.g., based on the measurements for these user terminals. Access point 110 may obtain measurements for each user terminal prior to data transmission to the user terminal and may select a set of antennas for the user terminal based on these measurements. This allows access point 110 to use the best set of antennas for each data transmission.

Access point 110 may store the antenna set selected for each user terminal in a look-up table. This antenna set may be indexed by an identifier for the user terminal. This identifier may be a Medium Access Control identifier (MAC ID) that access point 110 assigns to the user terminal at the start of a communication session or may be some other type of identifier. Table 1 shows an exemplary look-up table for user terminals 120a through 120d in the example shown in FIG. 1.

TABLE 1

| User terminal | Antenna Set |
| --- | --- |
| User terminal 120a | Antenna 114a |
| User terminal 120b | Antennas 114a, 114d, 114e and 114f |
| User terminal 120c | Antennas 112a, 112l and 114m |
| User terminal 120d | Antennas 112l and 114c |

Access point 110 may not have any measurements for a given user terminal at the start of a data transmission to the user terminal. Access point 110 may then access the look-up table with the user terminal's MAC ID and retrieve the set of antennas previously selected for the user terminal. Access point 110 may transmit data to the user terminal using this previously selected set of antennas until the set is updated, e.g., with new measurements.

Access point 110 selects a first set of T antennas for downlink data transmission to a user terminal and selects a second set of R antennas for reception of an uplink data transmission from the user terminal. In general, $N \geq T \geq 1$, $N \geq R \geq 1$, and T may or may not be equal to R. R may also be greater than N if supported by the spatial processing at access point 110, but this possibility is not described below for simplicity. The number of transmit antennas (T) is dependent on the number of good antennas available for downlink data transmission, the transmission mode used by access point 110 for the downlink data transmission, and possibly other factors. An antenna may be considered as good if it passes one or more selection criteria, e.g., if its power measurement exceeds the power threshold. The number of receive antennas (R) is dependent on the number of good antennas available for uplink data reception, the transmission mode used by the user terminal for the uplink data transmission, and possibly other factors.

Access point 110 may select the first set of T transmit antennas as described above and may also select the second set of R receive antennas in similar manner. The first set of antennas may be the same as, or different from, the second set of antennas. The processing at access point 110 may be simplified by using a single set of antennas for both data transmission and reception. In this case, each selected antenna is used to both transmit and receive RF signals to/from the user terminal.

Figure 3:
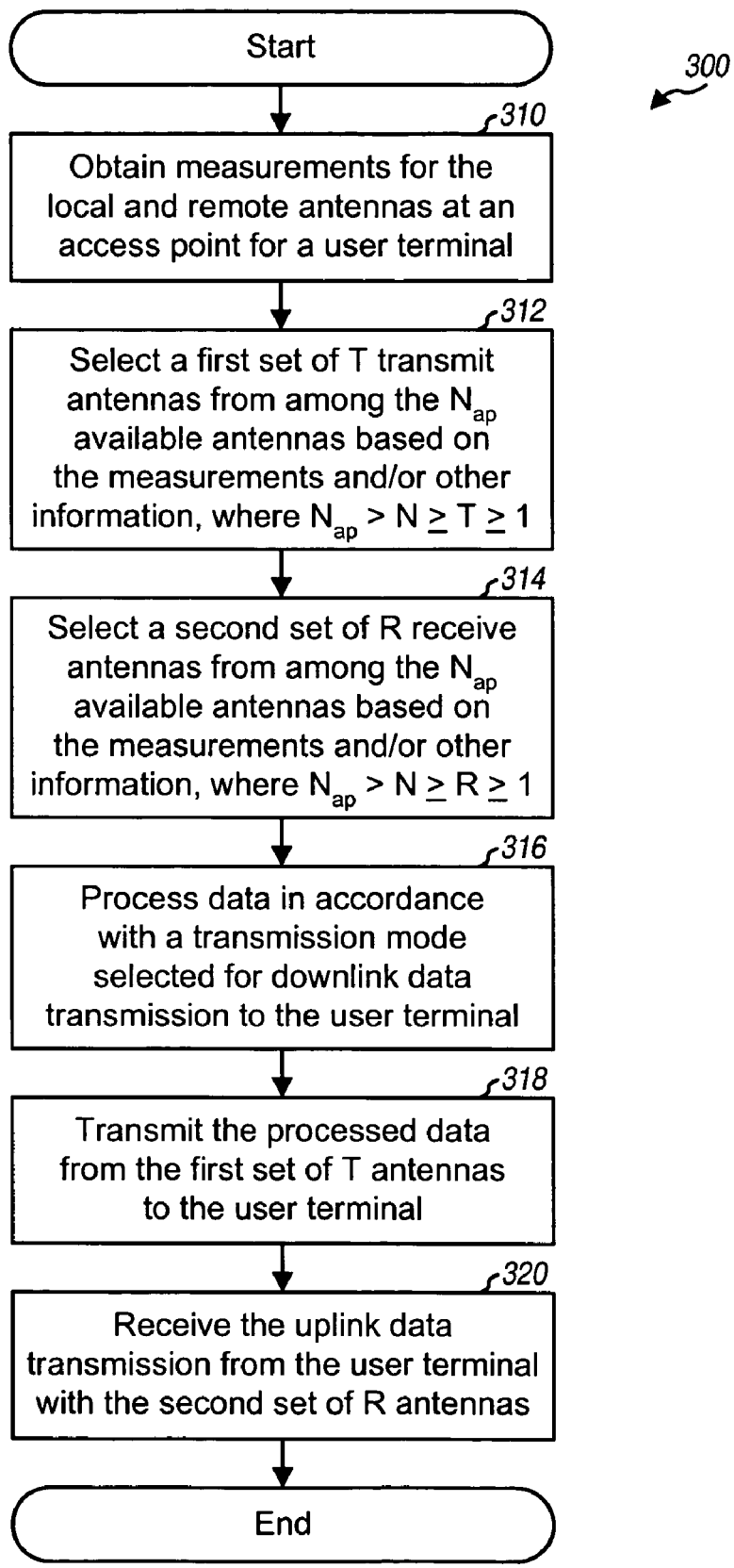
FIG. 3 shows a process performed by the access point to transmit data to and receive data from a user terminal.

FIG. 3 shows a process 300 performed by access point 110 for transmitting data to and receiving data from a user terminal. Measurements are obtained for the local and remote antennas at access point 110, e.g., based on a pilot transmitted by the user terminal (block 310). The measurements may be for received power and/or some other parameters. A first set of one or more (T) transmit antennas is selected from among the $N_{ap}$ antennas available at access point 110 based on the measurements and/or other information, where $N_{ap} > N \geq T \geq 1$ (block 312). The antenna selection may be performed in various manners, as described above. If no measurements are available, then the set of antennas last used for data transmission to the user terminal may be retrieved from the look-up table and used for the current downlink data transmission. A transmission mode is selected for data transmission to the user terminal based on the number of transmit antennas selected.

A second set of one or more (R) receive antennas is also selected from among the $N_{ap}$ antennas available at access point 110 based on the measurements and/or other information, where $N_{ap} > N \geq R \geq 1$ (block 314). The first and second sets may have the same or different numbers of antennas, e.g., depending on the transmission modes used for downlink and uplink data transmissions. Even if R=T, the second set may contain the same or different antennas than the antennas in the first set.

Access point 110 processes data in accordance with the selected transmission mode for the downlink (block 316) and then transmits the processed data from the first set of T antennas to the user terminal (block 318). Access point 110 receives the uplink data transmission from the user terminal via the second set of R antennas (block 320).

Referring back to FIG. 1, access point 110 may serve multiple user terminals 120 within WLAN 100. Each user terminal 120 may require a specific set of transmit antennas for good downlink performance and a specific set of receive antennas for good uplink performance. Access point 110 may dynamically switch between different sets of antennas used for different user terminals so that each user terminal is served with the sets of transmit/receive antennas that provide good performance for that user terminal. The electronics at access point 110 may be designed with the capability to quickly switch (e.g., on a per data packet basis, or a per frame basis) to different sets of antennas for different user terminals.

Figure 4:
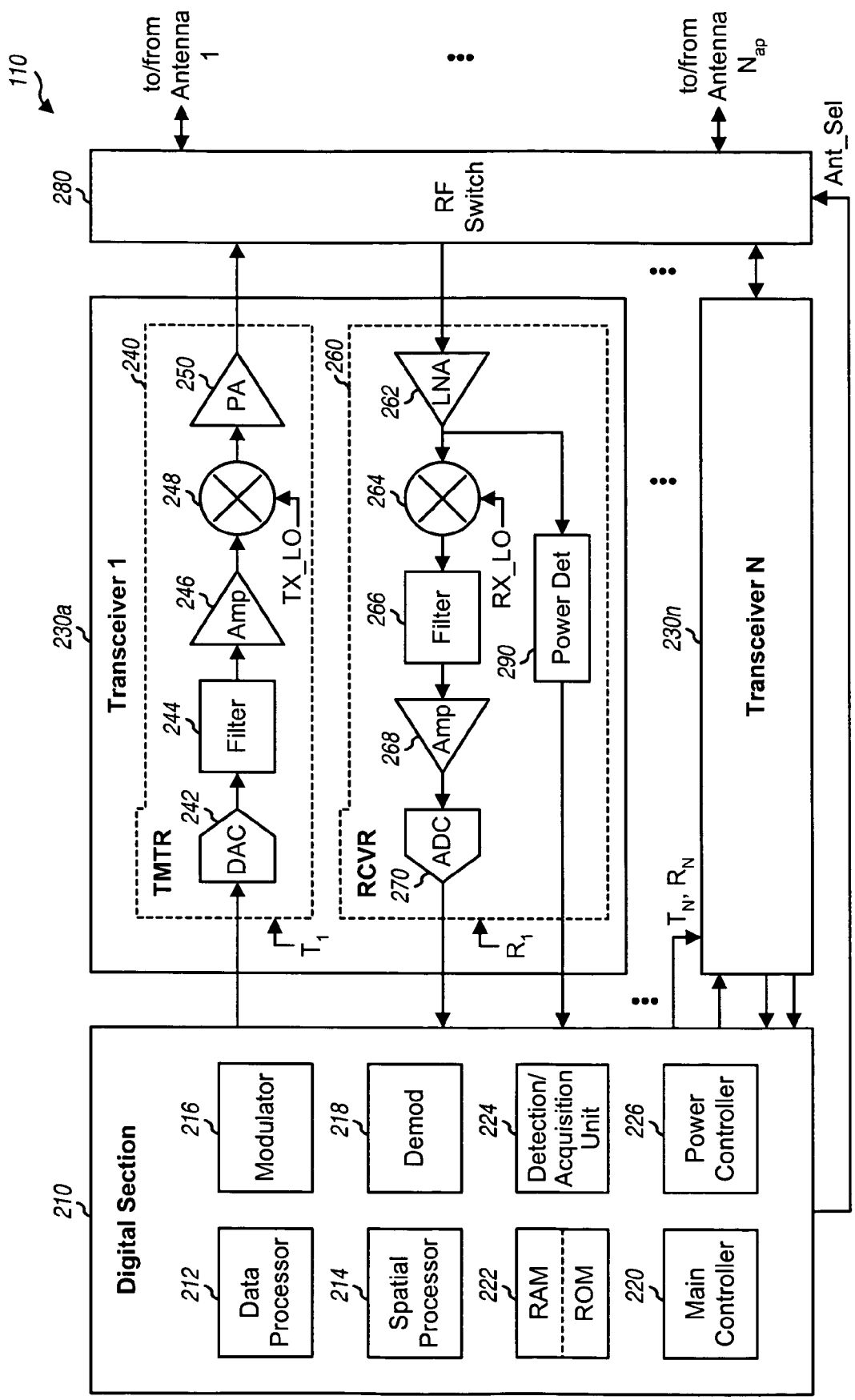
FIG. 4 shows a block diagram of the access point.

FIG. 4 shows an embodiment of access point 110. For this embodiment, access point 110 includes a digital section 210 that performs digital processing, N transceivers 230a through 230n that perform signal conditioning for RF and baseband signals for N antennas, and an RF switch 280 that couples the N transceivers 230 to the N antennas selected from among the $N_{ap}$ available antennas at access point 110.

Each transceiver 230 includes a transmitter unit (TMTR) 240 and a receiver unit (RCVR) 260. The transmitter and receiver units may be implemented with a super-heterodyne architecture or a direct-conversion architecture. For the super-heterodyne architecture, frequency conversion between RF and baseband is performed in multiple stages, e.g., from RF to an intermediate frequency (IF) in one stage, and from IF to baseband in another stage. For the direct-conversion architecture, frequency conversion is performed in a single stage, e.g., from RF directly to baseband. For simplicity, FIG. 4 shows an embodiment of transmitter unit 240 and receiver unit 260 implemented with the direct-conversion architecture.

Within transmitter unit 240, a digital-to-analog converter (DAC) 242 receives a stream of digital chips from digital section 210, converts the chips to analog, and provides an analog baseband signal. A filter 244 then filters the analog baseband signal to remove undesired images generated by the digital-to-analog conversion and provides a filtered baseband signal. An amplifier (Amp) 246 amplifies and buffers the filtered baseband signal and provides an amplified baseband signal. A mixer 248 modulates a TX_LO carrier signal from a voltage controlled oscillator (VCO) (not shown in FIG. 4) with the amplified baseband signal and provides an upconverted signal. A power amplifier (PA) 250 amplifies the upconverted signal and provides an RF modulated signal to RF switch 280.

For the transmit path, RF switch 280 receives up to N RF modulated signals from transmitter units 240 in N transceivers 230a through 230n. RF switch 280 also receives an Ant_Sel control signal that indicates which transceiver is to be coupled to which AP antenna. RF switch 280 routes each received RF modulated signal to either a selected local antenna 112 or a remote front-end 116 for a selected remote antenna 114. For the receive path, RF switch unit 280 receives an RF input signal from each local antenna 112 and each remote antenna 114 selected for data reception. RF switch unit 280 routes each received RF input signal to receiver unit 260 within the designated transceiver 230. RF switch unit 280 may be implemented with transmit/receive (T/R) switches, duplexers, and so on, as is known in the art. RF switch unit 280 avoids the need to have a separate transceiver 230 for each of the $N_{ap}$ antennas at access point 110.

Within receiver unit 260, a low noise amplifier (LNA) 262 receives an RF input signal from RF switch 280 for a selected AP antenna. LNA 262 amplifies the received RF signal and provides a conditioned RF signal having the desired signal level. A mixer 264 demodulates the conditioned RF signal with an RX_LO signal from the VCO and provides a downconverted signal. A filter 266 filters the downconverted signal to pass the desired signal components and remove noise and undesired signals that may be generated by the frequency downconversion process. An amplifier 268 amplifies and buffers the filtered signal and provides an analog baseband signal. An analog-to-digital converter (ADC) 270 digitizes the analog baseband signal and provides a stream of samples to digital section 210.

For the embodiment shown in FIG. 4, power detector 290 within receiver unit 260 receives the conditioned RF signal from LNA 262, measures the received power in the conditioned RF signal, and provides power measurements to main controller 220 within digital section 210. Power detector 290 may also measure the received power based on a baseband signal (e.g., after filter 266 or amplifier 268). Power detector 290 may be implemented in various manners, as is known in the art.

FIG. 4 shows an exemplary design for the transmitter and receiver units. In general, the transmitter and receiver units may each include one or more stages of amplifier, filter, mixer, and so on, which may be arranged differently from the configuration shown in FIG. 4. The transmitter and receiver units may also include different and/or additional elements not shown in FIG. 4.

FIG. 4 also shows an embodiment of digital section 210, which includes various processing units that perform digital processing for data transmission and reception. Within digital section 210, a data processor 212 performs encoding, interleaving, and symbol mapping for data transmission and symbol demapping, deinterleaving, and decoding for data reception. A spatial processor 214 performs transmitter spatial processing (e.g., for beamforming, eigensteering, and so on) for data transmission and receiver spatial processing (e.g., spatial matched filtering) for data reception, as described below. A modulator 216 performs modulation (e.g., for orthogonal frequency division multiplexing (OFDM)) for data transmission. A demodulator 218 performs demodulation (e.g., for OFDM) for data reception. A detection/acquisition unit 224 performs processing to detect and acquire signals from the user terminals. Main controller 220 controls the operation of various processing units within access point 110 and generates controls for transceivers 230 and remote front-ends 116. For example, main controller 220 may generate the $T_i$ control signals used to enable and disable each transmitter unit 230 and the $R_i$ control signals used to enable and disable each receiver unit 260. A power controller 226 performs power management for access point 110. For example, power controller 226 may determine whether or not to send DC power to remote front-ends 116. A random access memory (RAM) and a read only memory (ROM) 222 store data and program codes used by various processing units within digital section 210. For example, memory 222 may store the antenna set selected for each user terminal.

Figure 5A:
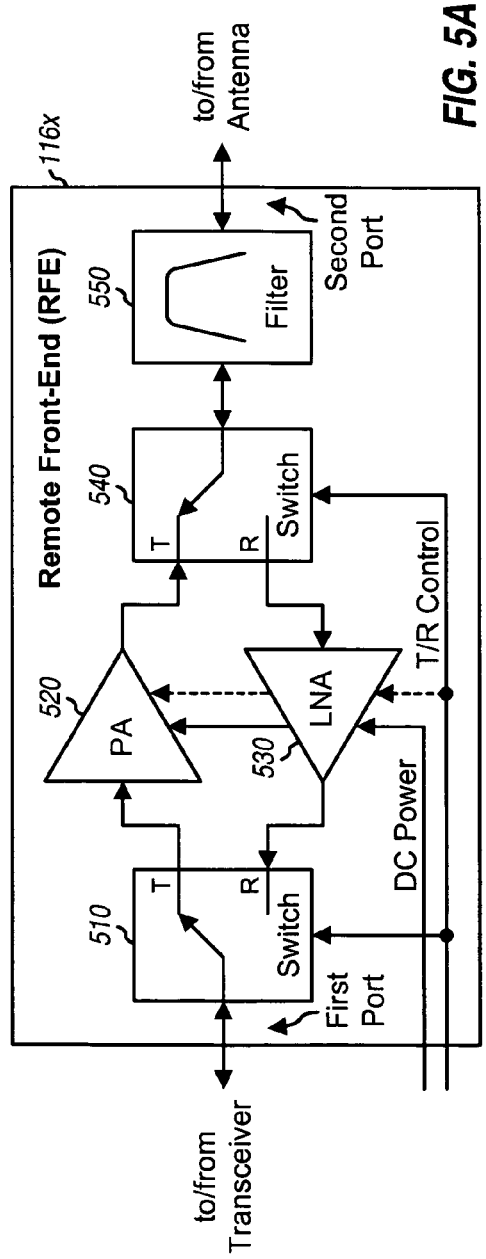
FIGS. 5A and 5B show two embodiments of a remote front-end.

FIG. 5A shows an embodiment of a remote front-end 116x, which may be used for each remote front-end 116 shown in FIG. 1. Remote front-end 116x may be used for a time division duplexed (TDD) communication system that transmits data on the downlink and uplink on the same frequency band at different times. For the embodiment shown in FIG. 5A, remote front-end 116x includes switches 510 and 540, a power amplifier 520, a low noise amplifier 530, and a bandpass filter 550. Switches 510 and 540 receive a transmit/receive (T/R) control signal that indicates whether RF signals are being transmitted or received by access point 110. Each switch couples its input to a "T" output during the transmit portion and to an "R" output during the receive portion, as indicated by the T/R control signal. Main controller 220 may generate the T/R control signal and provide this signal to each remote front-end 116 via the associated transceiver 230 (not shown in FIG. 4).

For the transmit path, an RF modulated signal from an associated transmitter unit 240 is received via a first port, routed via switch 510, and amplified by power amplifier 520 with a fixed or variable gain to obtain the desired output signal level. The amplified signal from power amplifier 520 is routed via switch 540, filtered by filter 550 to remove out-of-band noise and undesired signal components, and provided via a second port to an associated remote antenna 114. For the receive path, an RF input signal from the associated remote antenna 114 is received via the second port, filtered by filter 550 to remove out-of-band noise and undesired signal components, routed via switch 540, and amplified by LNA 530 with a fixed or variable gain. The amplified signal from LNA 530 is routed via switch 510 and provided via the first port to an associated receiver unit 260.

Power amplifier 520 and/or LNA 530 may be powered down whenever possible to reduce power consumption. For example, the T/R control signal may power down power amplifier 520 during the receive portion and power down LNA 530 during the transmit portion. The RF signals, T/R control signal, and DC power may be provided by access point 110 to remote front-end 116x via cable 118 or by some other means.

Figure 5B:
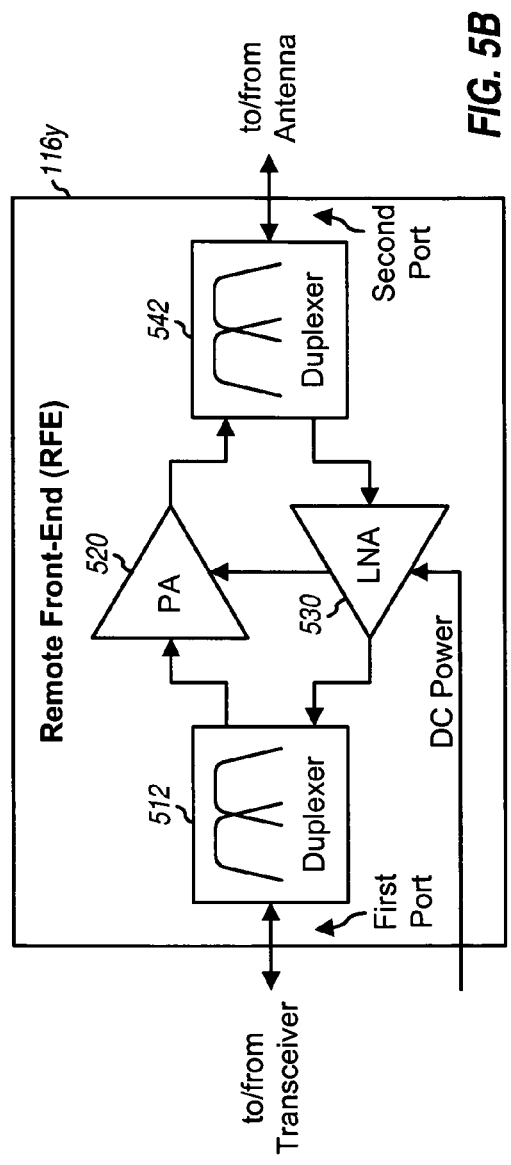

FIG. 5B shows an embodiment of a remote front-end 116y, which may also be used for each remote front-end 116 shown in FIG. 1. Remote front-end 116y may be used for a frequency division duplexed (FDD) communication system that can transmit data on the downlink and uplink simultaneously on different frequency bands. For the embodiment shown in FIG. 5B, remote front-end 116y includes duplexers 512 and 542, power amplifier 520, and LNA 530.

For the transmit path, an RF modulated signal from an associated transmitter unit 240 is received via the first port, filtered by duplexer 512, routed to power amplifier 520, amplified with a gain to obtain the desired output signal level, filtered by duplexer 542, and provided via the second port to an associated remote antenna 114. For the receive path, an RF input signal from the associated antenna 114 is received via the second port, filtered by duplexer 542, routed to LNA 530, amplified with a gain, filtered by duplexer 512, and provided via the first port to an associated receiver unit 260. The T/R control signal is not needed for remote front-end 116y.

FIGS. 5A and 5B show specific embodiments of remote front-ends 116x and 116y, respectively. In general, the transmit and receive paths may each include one or more stages of amplifier, filter, and so on. The transmit and receive paths may also include fewer, different, and/or additional circuit blocks not shown in FIGS. 5A and 5B.

For clarity, the description above shows each remote antenna 114 being coupled to an associated remote front-end 116, and each transceiver 230 processing the RF signals for one AP antenna. In general, each remote front-end 116 and/or each transceiver 230 may be associated with a set of one or more antenna elements. If a remote front-end or a transceiver is associated with multiple antenna elements, then these antenna elements may be viewed as a single (distributed) "antenna" for the remote front-end or transceiver.

In WLAN 100, "dummy" stations may be placed throughout the WLAN deployment area and used for various functions such as system configuration, calibration of the transmitter and receiver electronics, antenna selection, and so on. These dummy stations may be inexpensive stations that have basic MAC/PHY functionality and may not require all of the software needed for regular stations.

Each dummy station may transmit training/pilot/sounding packets at designated times or whenever directed by access point 110. Access point 110 may use the training packets to perform various functions. For example, access point 110 may calibrate the frequency responses of transmitter unit 240 and receiver unit 260 within transceivers 230a through 230n and the frequency responses of remote front-ends 116a through 116m based on the training packets. If the dummy stations are at known locations, then access point 110 can ascertain the channel quality observed by remote antennas 114 and may use the channel quality information for antenna selection.

An exemplary scenario for using the dummy stations may be as follows. The dummy stations may be placed strategically at entrances and exits to the coverage area, e.g., at entrances to a big office complex with many cubicles and offices. Each dummy stations can transmit training packets to the access point, which can process these training packets and construct transmit and receive eigenvectors for the dummy station. When a new station enters this office complex with an active call already in progress, handoff of the new station to the access point may be simplified by using pre-computed eigenvectors from the nearest dummy station, which may be identified based on signal strength measurements. This can make handoffs smoother and faster. Eventually, the packet by packet transmissions will enable derivation of more optimal eigenvectors for the new station, but the dummy stations will provide a reasonable starting point.

WLAN 100 may support multiple transmission modes such as, for example, no steering, beamsteering, eigensteering, space-time transmit diversity (STTD), space-frequency transmit diversity (SFTD), and so on. Table 2 lists the number of antennas used for data transmission and the number of antennas used for data reception for each transmission mode. $N_{ap}$ is the total number of antennas available at the access point, and $N_{ut}$ is the total number of antennas available at a user terminal scheduled for downlink and uplink data transmission. In Table 2 and in the description below, for each transmission mode, T is the number of antennas used by the access point for downlink data transmission to the user terminal using that transmission mode, N is the maximum number of antennas allowed by the WLAN for data transmission on the downlink and uplink, and $S_{dn}$ is the number of data streams being transmitted simultaneously by the access point to the user terminal, where $S_{dn} \leq \min\{N, N_{ut}\}$ and $N_{ap} > N$. For each transmission mode, R is the number of antennas used by the access point for reception of an uplink data transmission sent by the user terminal using that transmission mode, and $S_{up}$ is the number of data streams being transmitted simultaneously by the user terminal to the access point.

TABLE 2

| | Transmission Mode | | | |
|---|---|---|---|---|
| | No Steering | Beamforming | Eigensteering | STTD & SFTD |
| Number of transmit antennas (T) | N ≥ T = $S_{dn}$ | N ≥ T > 1 | N ≥ T ≥ $S_{dn}$ | T = 2 |
| Number of receive antennas (R) | N ≥ R ≥ $S_{up}$ | N ≥ R ≥ 1 | N ≥ R ≥ $S_{up}$ | N ≥ R ≥ 1 |

The same or different transmission modes may be used for downlink and uplink data transmission between the access point and the user terminal. The access point may use the same or different sets of antennas for downlink data transmission and uplink data reception. The spatial processing performed by access point 110 for the transmission modes listed in Table 2 is described below.

Access point 110 may perform beamsteering to steer a downlink data transmission toward a specific user terminal x. User terminal x may have a single antenna and may be user terminal 120a or 120c in FIG. 1. Access point 110 selects multiple (T) antennas from among the $N_{ap}$ available antennas for data transmission to user terminal x. A MISO channel is formed between the T selected antennas at access point 110 and the single antenna at user terminal x. This MISO may be characterized by a 1×T channel response row vector $\underline{h}_{dn,x}(k)=[h_{x,1}(k)\ h_{x,2}(k)\ \ldots\ h_{x,T}(k)]$ for each subband k, where $h_{x,j}(k)$, for $j=1,\ldots,T$, is the complex channel gain between AP antenna j and the single UT antenna for subband k. Access point 110 may perform spatial processing for beamforming, as follows:

$$\underline{x}_{dn,x}(k)=\underline{h}_{dn,x}^{H}(k)\cdot s_{dn,x}(k), \text{ for } k\in\{1,\ldots,K\}, \quad \text{Eq (1)}$$

where $s_{dn,x}(k)$ is a data symbol to be sent on subband k to user terminal x, $\underline{x}_{dn,x}(k)$ is a vector with T transmit symbols to be sent from the T selected antennas at access point 110, "H" denotes a conjugate transpose, and K is the number of subbands used for data transmission.

Access point 110 may transmit $S_{dn}$ data streams simultaneously from up to N antennas to a user terminal y. User terminal y has multiple ($N_{ut}$) antennas and may be user terminal 120b or 120d in FIG. 1. Access point 110 selects multiple (T) antennas from among the $N_{ap}$ available antennas for downlink data transmission to user terminal y, where $T=S_{dn}$ for no steering. Access point 110 may perform spatial processing for no steering, as follows:

$$\underline{x}_{dn,ns,y}(k)=\underline{s}_{dn,y}(k), \text{ for } k\in\{1,\ldots,K\}, \quad \text{Eq (2)}$$

where $\underline{s}_{dn,y}(k)$ is a vector with $S_{dn}$ data symbols to be sent on subband k to user terminal y and $\underline{x}_{dn,ns,y}(k)$ is a vector with T transmit symbols to be sent from the T selected antennas on subband k to user terminal y for no steering.

Access point 110 may perform eigensteering to transmit multiple data streams on orthogonal spatial channels (or eigenmodes) to user terminal y. A MIMO channel is formed between the T selected antennas at access point 110 and the $N_{ut}$ antennas at user terminal y. This MIMO may be characterized by an $N_{ut}\times T$ channel response matrix $\underline{H}_{dn,y}(k)$ for subband k, which may be expressed as:

$$\underline{H}_{dn,y}(k)=\begin{bmatrix} h_{y,1,1}(k) & h_{y,1,1}(k) & \cdots & h_{y,1,T}(k) \\ h_{y,2,1}(k) & h_{y,1,1}(k) & \cdots & h_{y,1,T}(k) \\ \vdots & \vdots & \ddots & \vdots \\ h_{y,N_{ut},1}(k) & h_{y,N_{ut},2}(k) & \cdots & h_{y,N_{ut},T}(k) \end{bmatrix}, \quad \text{Eq (3)}$$

for $k \in \{1,\ldots,K\}$, where $h_{y,i,j}(k)$, for $i=1,\ldots,N_{ut}$ and $j=1,\ldots,T$, is the complex channel gain between antenna j at access point 110 and antenna i at user terminal y for subband k. The channel response matrix $\underline{H}_{dn,y}(k)$ may be diagonalized via eigenvalue decomposition, as follows:

$$\underline{R}_{dn,y}(k)=\underline{H}_{dn,y}^{H}(k)\cdot\underline{H}_{dn,y}(k)=\underline{E}_{dn,y}(k)\cdot\underline{\Lambda}_{dn,y}(k)\cdot\underline{E}_{dn,y}^{H}(k), \quad \text{Eq (4)}$$

where $\underline{E}_{dn,y}(k)$ is a unitary matrix of eigenvectors and $\underline{\Lambda}_{y}(k)$ is a diagonal matrix of eigenvalues for subband k. The diagonal elements of $\underline{\Lambda}_{y}(k)$ are eigenvalues that represent the power gains for S eigenmodes of $\underline{H}_{dn,y}(k)$, where $S \leq \min\{T, N_{ut}\}$. The eigenmodes may be viewed as orthogonal spatial channels. Access point 110 may use the eigenvectors (or columns) in $\underline{E}_{dn,y}(k)$ to transmit data on the eigenmodes of $\underline{H}_{dn,y}(k)$. Access point 110 may transmit up to S data streams simultaneously on the S eigenmodes of $\underline{H}_{dn,y}(k)$, or $S_{dn} \leq S$.

Access point 110 may perform spatial processing for eigensteering, as follows:

$$\underline{x}_{dn,es,y}(k)=\underline{E}_{dn,y}(k)\cdot\underline{s}_{dn,y}(k), \quad \text{Eq (5)}$$

where $\underline{x}_{dn,es,y}(k)$ is a vector with T transmit symbols to be sent from the T selected antennas on subband k to user terminal y for eigensteering. Access point 110 may also transmit data on the best eigenmode of $\underline{H}_{dn,y}(k)$ by performing spatial processing for beamsteering with the eigenvector for this best eigenmode, e.g., as shown in equation (1).

Access point 110 may transmit a single data stream from two antennas to a user terminal using STTD or SFDT. For STTD, access point 110 generates two vectors $\underline{x}_{dn,td,1}=[s_1\ s_2]^T$ and $\underline{x}_{dn,td,2}=[s^*_2\ -s^*_1]^T$ for each pair of data symbols $s_1$ and $s_2$, where "*" denotes the complex conjugate and "$T$" denotes the transpose. Access point 110 transmits the two coded symbols in vector $\underline{x}_{dn,td,1}$ from two selected antennas on one subband in a first symbol period and then transmits the two coded symbols in vector $\underline{x}_{dn,td,2}$ from the same two antennas on the same subband in a second symbol period. For SFDT, access point 110 transmits the two coded symbols in vector $\underline{x}_{dn,td,1}$ from the two selected antennas on a first subband and transmits the two coded symbols in vector $\underline{x}_{dn,td,2}$ on a second subband in the same symbol period.

Access point 110 may use multiple (R) antennas for reception of an uplink data transmission from a user terminal. Access point 110 selects R antennas from among the $N_{ap}$ available antennas, where R is dependent on the transmission mode used by the user terminal for the uplink data transmission, as shown in Table 2. R may also be greater than N if supported by the spatial processing at the access point. For a TDD system, the downlink and uplink may be assumed to be reciprocal so that the channel response for the uplink is equal to the transpose of the channel response for the downlink, e.g., $\underline{h}_{up,x}(k) = \underline{h}_{dn,x}^T(k)$ and $\underline{H}_{up,y}(k) = \underline{H}_{dn,y}^T(k)$.

The received symbols at access point 110 for an uplink data transmission from single-antenna terminal x may be expressed as:

$$\underline{r}_{up,x}(k) = \underline{h}_{up,x}(k) \cdot s_{up,x}(k) + \underline{w}_{up,x}(k), \quad \text{Eq (6)}$$

where $s_{up,x}(k)$ is a data symbol sent on subband k by user terminal x, $\underline{r}_{up,x}(k)$ is a vector with R received symbols for user terminal x, and $\underline{w}_{up,x}(k)$ is a received noise vector at access point 110.

Access point 110 may perform receiver matched filtering as follows:

$$\hat{s}_{up,x}(k) = \underline{h}_{up,x}^H(k) \cdot \underline{r}_{up,x}(k) = \|\underline{h}_{up,x}(k)\| \cdot s_{up,x}(k) + w_{up,x}(k) \quad \text{Eq (7)}$$

where $\hat{s}_{up,x}(k)$ is an estimate of $s_{up,x}(k)$ and $w_{up,x}(k)$ is the post-processed noise observed by $s_{up,x}(k)$.

The received symbols at access point 110 for an uplink data transmission from multi-antenna terminal y using no steering or eigensteering may be expressed as:

$$\underline{r}_{up,y}(k) = \underline{H}_{up,y}(k) \cdot \underline{x}_{up,y}(k) + \underline{w}_{up,y}(k) = \underline{H}_{eff,y}(k) \cdot \underline{s}_{up,y}(k) + \underline{w}_{up,y}(k), \quad \text{Eq (8)}$$

where $\underline{s}_{up,y}(k)$ is a vector of data symbols sent by user terminal y, $\underline{x}_{up,y}(k)$ is vector of transmit symbols for the $N_{ut}$ antennas at user terminal y, $\underline{H}_{eff,y}(k)$ is an effective channel response matrix for the uplink, and $\underline{r}_{up,y}(k)$ is a vector of received symbols at access point 110 for user terminal y. $\underline{H}_{eff,y}(k)$ is dependent on the transmission mode used by user terminal y for the uplink data transmission, e.g., $\underline{H}_{eff,y}(k) = \underline{H}_{up,y}(k) \cdot \underline{E}_{up,y}(k)$ if user terminal y performs eigensteering and $\underline{H}_{eff,y}(k) = \underline{H}_{up,y}(k)$ if user terminal y performs no steering.

Access point 110 may perform receiver spatial processing as follows:

$$\hat{\underline{s}}_{up,y}(k) = \underline{M}_{up,y}(k) \cdot \underline{r}_{up,y}(k) = \underline{s}_{up,y}(k) + \tilde{\underline{w}}_{up,y}(k), \quad \text{Eq (9)}$$

where $\underline{M}_{up,y}(k)$ is a spatial filter matrix for subband k and $\tilde{\underline{w}}_{up,y}(k)$ is the post-detection noise. Access point 110 may derive the spatial filter matrix $\underline{M}_{up,y}(k)$ using any one of the following:

$$\underline{M}_{up,y1}(k) = \underline{\Lambda}_{up,y}^{-1}(k) \cdot \underline{E}_{up,y}^H(k) \cdot \underline{H}_{up,y}^H(k), \quad \text{Eq (10)}$$

$$\underline{M}_{up,y2}(k) = [\underline{H}_{eff,y}^H(k) \cdot \underline{H}_{eff,y}(k)]^{-1} \cdot \underline{H}_{eff,y}^H(k), \quad \text{Eq (11)}$$

$$\underline{M}_{up,y3}(k) = \underline{D}_{up,y}(k) \cdot [\underline{H}_{eff,y}^H(k) \cdot \underline{H}_{eff,y}(k) + \sigma_n^2 \cdot \underline{I}]^{-1} \cdot \underline{H}_{eff,y}^H(k), \quad \text{Eq (12)}$$

where $\underline{D}_y(k) = [\text{diag} [\underline{M}'_{up,y3}(k) \cdot \underline{H}_{eff,y}(k)]]^{-1}$, $\underline{M}'_{up,y3}(k) = [\underline{H}_{eff,y}^H(k) \cdot \underline{H}_{eff,y}(k) + \sigma_n^2 \cdot \underline{I}]^{-1} \cdot \underline{H}_{eff,y}^H(k)$, $\underline{I}$ is the identity matrix, and $\sigma_n^2$ is the variance of the noise at access point 110.

Equation (10) is for a matched filtering technique for eigensteering, equation (11) is for a zero-forcing technique, and equation (12) is for a minimum mean square error (MMSE) technique. The zero-forcing and MMSE techniques may be used for the no steering and eigensteering transmission modes.

The received symbols at access point 110 for an uplink data transmission from multi-antenna terminal y using STTD may be expressed as:

$$\underline{r}_{up,td,y1}(k) = \underline{h}_{up,ya1}(k) \cdot s_{y1}(k) + \underline{h}_{up,ya2}(k) \cdot s_{y2}(k) + \underline{w}_{up,y1}(k), \text{ and} \quad \text{Eq (13)}$$

$$\underline{r}_{up,td,y2}(k) = \underline{h}_{up,ya1}(k) \cdot s^*_{y2}(k) - \underline{h}_{up,ya2}(k) \cdot s^*_{y1}(k) + \underline{w}_{up,y2}(k), \quad \text{Eq (14)}$$

where $s_{y1}(k)$ and $s_{y2}(k)$ are two data symbols sent from two UT antennas y1 and y2 in two symbol periods on subband k using STTD, $\underline{h}_{up,ya1}(k)$ and $\underline{h}_{up,ya2}(k)$ are vectors of channel gains between the two UT antennas y1 and y2, respectively, and the R selected AP antennas, $\underline{r}_{up,td,y1}(k)$ and $\underline{r}_{up,td,y2}(k)$ are vectors of received symbols for subband k in the two symbol periods, and $\underline{w}_{up,y1}(k)$ and $\underline{w}_{up,y1}(k)$ are the noise vectors for the two symbol periods. $R \geq 1$ for the STTD and SFTD transmission modes.

Access point 110 may derive estimates of the two data symbols, $s_{y1}(k)$ and $s_{y2}(k)$, as follows:

$$\hat{s}_{y1}(k) = \frac{\underline{h}_{up,ya1}^H(k) \cdot \underline{r}_{up,td,y1}(k) - \underline{r}_{up,td,y2}^H(k) \cdot \underline{h}_{up,ya2}(k)}{\|\underline{h}_{up,ya1}(k)\|^2 + \|\underline{h}_{up,ya2}(k)\|^2}$$

$$= s_{y1}(k) + \tilde{w}_{y1}(k),$$

and $$\hat{s}_{y2}(k) = \frac{\underline{h}_{up,ya2}^H(k) \cdot \underline{r}_{up,td,y1}(k) + \underline{r}_{up,td,y2}^H(k) \cdot \underline{h}_{up,ya1}(k)}{\|\underline{h}_{up,ya1}(k)\|^2 + \|\underline{h}_{up,ya2}(k)\|^2}$$

$$= s_{y2}(k) + \tilde{w}_{y2}(k),$$

where $\hat{s}_{y1}(k)$ and $\hat{s}_{y2}(k)$ are estimates of $s_{y1}(k)$ and $s_{y2}(k)$, respectively, and $\tilde{w}_{y1}(k)$ and $\tilde{w}_{y2}(k)$ are post-processed noise observed by $s_{y1}(k)$ and $s_{y2}(k)$, respectively.

The multi-antenna station described herein may be implemented by various means. For example, the multi-antenna station and any functions described herein may be implemented with a combination of hardware, firmware, or software. The units used to make measurements for the AP antennas, select antennas for data transmission and reception, and process data and signals may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, RF integrated circuits (RFICs), other electronic units designed to perform the functions described herein, or a combination thereof.

The antenna selection may be performed with hardware or software. For a software implementation, the antenna selection may be performed with modules (e.g., procedures, functions, and so on) that perform the functions described herein. The software codes may be stored in a memory unit (e.g., memory unit 222 in FIG. 4) and executed by a processor (e.g., controller 220). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A multi-antenna station comprising:
    a plurality of antennas coupled to the multi-antenna station comprising at least one remote antenna that is located away from the multi-antenna station, the plurality of antennas are coupled to the multi-antenna station based at least in part on the type of each antenna and an intended coverage area of each antenna, the antennas are configured for data transmission to terminals;
    a controller that selects a set of antennas from the plurality of antennas for a particular terminal based at least in part on a power gap that exceeds a predetermined power gap threshold, wherein the power gap is a computed difference in power measurements associated with the particular terminal for individual antennas comprising the plurality of antennas; and
    at least one transmitter that broadcasts data to the particular terminal via the set of antennas.

2. The multi-antenna station of claim 1, wherein the controller further obtains one or more signal-to-noise ratio, received signal strength, or correlation measurements for the antennas and selects the set of antennas based at least in part on the measurements.

3. The multi-antenna station of claim 1, further comprising at least one power detector that measures received power of the plurality of antennas and provides one or more power measurements for each of the plurality of antennas.

4. The multi-antenna station of claim 3, wherein the controller orders antennas according to highest power measurements among the plurality of antennas, computes the power gap between power measurements of adjacent ordered antennas, compares the power gap computed between the adjacent ordered antennas to the predetermined power gap threshold, and selects the adjacent ordered antennas that have a power gap exceeding the threshold.

5. The multi-antenna station of claim 3, wherein the controller selects the antennas with power measurements above a predetermined power threshold.

6. The multi-antenna station of claim 1, wherein the controller selects a set of one or more remote antennas nearest to the antenna in use.

7. The multi-antenna station of claim 1, wherein the controller further selects a set of antennas based on location information associated with the set of antennas in use with the particular terminal.

8. The multi-antenna station of claim 1, wherein the controller selects a transmission mode from a plurality of supported transmission modes based at least in part on a number of antennas in the set, the selected transmission mode is used for communication of data to the particular terminal.

9. The multi-antenna station of claim 1, further comprising a memory unit that stores the set of antennas for the particular terminal and provides the set of antennas a subsequent data transmission to the particular terminal.

10. The multi-antenna station of claim 1, wherein the controller further selects a second set of antennas from the plurality of antennas for reception of an uplink transmission from the particular terminal.

11. The multi-antenna station of claim 10, wherein the controller selects the second set of antennas based at least in part on a transmission mode used by the particular terminal for the uplink transmission.

12. The multi-antenna station of claim 10, wherein the controller selects the set of antennas used for data transmission to the particular terminal as the second set of antennas used for reception of the uplink transmission from the particular terminal.

13. The multi-antenna station of claim 10, further comprising at least one receiver that accepts the uplink transmission from the particular terminal via the second set of antennas.

14. The multi-antenna station of claim 1, further comprising at least one remote front-end coupled to the at least one remote antenna, wherein each remote front-end performs signal conditioning for radio frequency (RF) signals transmitted or received via an associated remote antenna.

15. The multi-antenna station of claim 1, further comprising a radio frequency (RF) switch that couples the transmitter to the plurality of antennas based on a modulated RF signal.

16. The multi-antenna station of claim 1, wherein the plurality of antennas comprise at least two remote antennas that are located away from the multi-antenna station, the remote antennas are distributed within a coverage area of the multi-antenna station.

17. The multi-antenna station of claim 1, wherein at least two of the antennas among the plurality of antennas have different radiation patterns.

18. A method of transmitting data, comprising:
    sorting a plurality of antennas coupled to a multi-antenna access point based on power measurements corresponding to a specific terminal, wherein the plurality of antennas include at least one local antenna coupled to the multi-antenna access point and at least one remote antenna coupled to the multi-station access point, a location of each of the plurality of antennas is based at least in part on an intended coverage area of each of the antennas having a directional or omni-directional radiation pattern;
    computing a difference in power between a pair of adjacent antennas sorted from the plurality of antennas;
    selecting a sorted pair of adjacent antennas when the difference in power exceeds a predetermined threshold for the pair of adjacent antennas to form a set of antennas; and
    transmitting data to the specific terminal via the set of antennas.

19. The method of claim 18, further comprising obtaining one or more signal quality measurements for each of the plurality of antennas.

20. The method of claim 19, wherein selecting the set of antennas further comprises selecting a predetermined number of antennas with highest signal quality measurements among the plurality of antennas.

21. The method of claim 19, wherein selecting the set of antennas further comprises selecting antennas with the signal quality measurements above a predetermined threshold.

22. The method of claim 18, wherein selecting the set of antennas is based at least in part on location information for the set of antennas selected based on the difference in power, wherein the location information is stored in a database.

23. The method of claim 18, further comprising:
storing in memory associated with the multi-antenna access point the set of antennas for the specific terminal; and
subsequently transmitting additional data to the specific terminal utilizing the stored set of antennas.

24. The method of claim 18, further comprising:
selecting a second set of one or more antennas from the plurality of antennas for reception of an uplink transmission from the specific terminal; and
receiving the uplink transmission via the second set of one or more antennas.

25. An apparatus comprising:
means for sorting a plurality of antennas via power measurements, wherein the plurality of antennas are sorted according to a power measurement associated with a given terminal on each antenna of the plurality of antennas, the plurality of antennas are arranged within a deployment area of the apparatus such that at least one of the plurality of antennas is remote to the apparatus, and the antennas are arranged based at least in part on a type of each antenna and an intended coverage area for each antenna;
means for selecting a set of antennas from the plurality of antennas associated with the apparatus, wherein the set of antennas is selected based at least in part on a measure of a power gap between antennas sorted consecutively according to the power measurements; and
means for transmitting data to the given terminal via the set of antennas.

26. The apparatus of claim 25, further comprising means for obtaining power measurements for each of the plurality of antennas.

27. The apparatus of claim 26, wherein the means for selecting the set of antennas comprises means for selecting a predetermined number of antennas with highest power measurements among the plurality of antennas.

28. The apparatus of claim 26, wherein the means for selecting the set of antennas comprises means for selecting antennas with power gap measurements between antennas adjacently sorted according to power measurements above a predetermined threshold so as to prevent selection of antennas with minimal additional power contribution.

29. The apparatus of claim 25, further comprising:
means for storing the set of antennas for the given terminal; and
means for subsequently transmitting data to the given terminal utilizing the stored set antennas.

30. The apparatus of claim 25, further comprising:
means for selecting a second set of one or more antennas from the plurality of antennas for reception of an uplink transmission from the given terminal; and
means for receiving the uplink transmission via the second set of one or more antennas.

31. A controller employing a processor operatively coupled to memory configured to implement instructions for transmitting data, comprising:
instructions for selecting a set of antennas from a plurality of antennas for data transmission from a multi-antenna station to a given terminal by measuring a power gap between antennas ordered from highest power measurement to lowest power measurement, and the selecting of the set of antennas based at least in part on the power gap that surpasses a predetermined amount of power, wherein the plurality of antennas comprise at least one remote antenna that is located away from the multi-antenna station;
instructions for transmitting data to the given terminal via the set of antennas; and
instructions for transmitting data between the multi-antenna and the given terminal via one or more spatial channels.

32. The controller of claim 31, further comprising instructions for obtaining one or more signal quality measurements for each the plurality of antennas, wherein the signal quality measurements include at least one of signal-to-noise ratio, received signal strength, or correlation data.

33. The controller of claim 32, wherein the instructions for selecting the set of antennas comprise instructions for selecting a predetermined number of antennas with highest signal quality measurements among the plurality of antennas.

34. The controller of claim 32, wherein the instructions for selecting the set of antennas comprise instructions for selecting antennas with signal quality measurements above a predetermined threshold.

35. The controller of claim 31, wherein the instructions for selecting the set of antennas are further based at least in part on location information for the set of antennas having a power gap that surpasses the predetermined amount of power.

36. The controller of claim 31, further comprising instructions for selecting a second set of antennas from the plurality of antennas for reception of an uplink transmission from the given terminal.

\* \* \* \* \*

UNITED STATES PATENT AND TRADEMARK OFFICE
CERTIFICATE OF CORRECTION

PATENT NO.       : 7,603,141 B2                                           Page 1 of 1
APPLICATION NO. : 11/144994
DATED            : October 13, 2009
INVENTOR(S)      : Subrahmanyam Dravida It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 921 days.

Signed and Sealed this

Fifth Day of October, 2010

David J. Kappos
*Director of the United States Patent and Trademark Office*